US007426497B2

(12) United States Patent
Bacioiu et al.

(10) Patent No.: US 7,426,497 B2
(45) Date of Patent: Sep. 16, 2008

(54) METHOD AND APPARATUS FOR ANALYSIS AND DECOMPOSITION OF CLASSIFIER DATA ANOMALIES

(75) Inventors: Ana Sultana Bacioiu, Kirkland, WA (US); David Michael Sauntry, Redmond, WA (US); James Scott Boyle, Sammamish, WA (US); Leon Chih Wen Wong, Redmond, WA (US); Peter F. Leonard, Seattle, WA (US); Raman Chandrasekar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 10/931,305

(22) Filed: Aug. 31, 2004

(65) Prior Publication Data

US 2006/0047617 A1    Mar. 2, 2006

(51) Int. Cl.
*G06N 5/00* (2006.01)
(52) U.S. Cl. ............................................. 706/12; 706/20
(58) Field of Classification Search .................... 706/12, 706/20; 382/128, 129; 600/476; 324/309
See application file for complete search history.

(56) References Cited

U.S. PATENT DOCUMENTS

| | | | | |
|---|---|---|---|---|
| 6,683,455 B2 * | 1/2004 | Ebbels et al. | ............... | 324/309 |
| 6,728,396 B2 * | 4/2004 | Wang | ......................... | 382/129 |
| 6,798,898 B1 * | 9/2004 | Fedorovskaya et al. | ..... | 382/128 |
| 6,799,170 B2 * | 9/2004 | Lee et al. | ...................... | 706/20 |
| 7,027,953 B2 * | 4/2006 | Klein | ......................... | 702/184 |
| 7,107,092 B2 * | 9/2006 | Goldstein et al. | ........... | 600/476 |
| 7,117,188 B2 * | 10/2006 | Guyon et al. | .................. | 706/20 |

OTHER PUBLICATIONS

Keerthi et al., S., "A Machine Learning Approach for the Curation of Biomedical Literature—KDD Cup 2002 (Task 1)", SIGKDD Explorations, vol. 4, Issue 2, pp. 93-94, Dec. 2002.
Luebbers et al., D., "Systematic Development of Data Mining-Based Quality Tools", Proceedings of the 29th VLDB Conference, Berlin, Germany, 2003.
Ansari et al., S., "Integrating E-Commerce and Data Mining: Architecture and Challenges",2001 IEEE International Conference on Data Mining Available, Nov. 29, 2001-Dec. 2, 2001.
Weiss et al., G., "The Effect of Class Distribution on Classifier Learning: An Empirical Study", Technical Report ML-TR-44, Department of Computer Science, Rutgers University, Aug. 2, 2001.
"WEKA 3—Data Mining with Open Source Machine Learning Software in Java", at least by Jul. 22, 2004.
Frank, E., "Machine Learning with WEKA", at least by Jul. 22, 2004.

\* cited by examiner

*Primary Examiner*—Wilbert L Starks, Jr.
(74) *Attorney, Agent, or Firm*—Westman, Champlin & Kelly, P.A.

(57) ABSTRACT

A human assisted method of debugging training data used to train a machine learning classifier is provided. The method includes obtaining a classifier training data set. The training data set is then debugged using an integrated debugging tool configured to implement a debugging loop to obtain a debugged data set. The debugging tool can be configured to perform an estimation and simplification step to reduce data noise in the training data set prior to further analysis. The debugging tool also runs a panel of prediction-centric diagnostic metrics on the training data set, and provides the user prediction based listings of the results of the panel of prediction-centric diagnostic metrics.

31 Claims, 10 Drawing Sheets

| PredictionEntropyDiagnostic | | | |
|---|---|---|---|
| Prediction | Training Examples | Feature Count | Feature Entropy |
| Mean | 2624.452 | 166.0645 | 9.090743 |
| 7e63040f-3ab1-496a-8343-b0249fc33 | | 18 | 6.7230485929815 |
| 767fa479-1e0a-4092-ab82-5d84c5818 | 22 | 18 | 3.7523040670763 |
| 6e9feb0c-0825-4bd5-b205-23f9dd8ac | 51 | 16 | 3.9825627281717 |
| 058d25e8-d7a2-4daa-a82c-12043582 | 38 | 19 | 4.8197297661407 |
| c3fc99a2-8f12-4a65-9ea0-5744b47d9 | 90 | 82 | 4.8834351129908 |
| afda8488-1a11-49b1-8258-a60703db | 28 | 31 | 8.3002368931.905 |
| 6d661b28-72de-4467-b08e-cbdb33d9 | 110 | 45 | 7.8488879832429 |
| 4227f0b9-d92e-4fe6-bec3-679734870 | 141 | 46 | 8.2989256791339 |
| 39c623ce-d9c3-4c39-8520-eb0c3b63 | 116 | 47 | 8.2278632661853 |
| 75020b93-ed7c-4963-97f4-23abdc4cc | 550 | 55 | 6.3813220023894 |
| 55c43395-7caf-4fc9-8226-094f13fbcf1 | 379 | 58 | 6.0464588456850 |
| e9ac0e49-7a7d-4bcd-bd24-c93200d2 | 247 | 66 | 8.4455695128973 |
| dd8f6dd2-d240-4006-ac4e-3982c0b15 | 449 | 68 | 8.7247891403897 |
| 4455d263-07f0-4c36-8dcd-db62c2f5f4 | 1049 | 93 | 6.7616522361939 |
| 6bb8e173-8f37-4e36-b409-450ee0aca | 422 | 98 | 10.308720372080 |
| 0815e410-edf6-4130-9d66-34dc11856 | 1271 | 106 | 6.9275196480504 |
| 940fa5f3-864d-473c-b173-e5c056d9fb | 292 | 131 | 4.2250235691546 |
| 41b414ab-6b1e-410b-b12b-b4231192f | 1045 | 151 | 10.163054617527 |
| 56e333ee-a0de-4aa7-9a08-5f28c88d9 | 1516 | 157 | 9.6745803187722 |
| 7626a288-24c7-4e0e-ac7f-d2dca51f5 | 6290 | 159 | 8.8164567647795 |

FIG. 3-2

TABLE 1

|    | P1 | P2 | ... | Pi | ... | Pj | ... | PN-1 | PN |
|----|----|----|-----|----|-----|----|----|------|----|
| P1 |    | $d_{12}$ | | $d_{1i}$ | | $d_{1j}$ | | $d_{1(N-1)}$ | $d_{1N}$ |
| P2 | $d_{21}$ | | | $d_{2i}$ | | $d_{2j}$ | | $d_{2(N-1)}$ | $d_{2N}$ |
| ... | | | | | | | | | |
| Pi | $d_{i1}$ | | | | | $d_{ij}$ | | $d_{i(N-1)}$ | $d_{iN}$ |
| ... | | | | | | | | | |
| Pj | $d_{j1}$ | $d_{j2}$ | | $d_{ji}$ | | | | $d_{j(N-1)}$ | $d_{jN}$ |
| ... | | | | | | | | | |
| PN-1 | | | | | | | | | |
| PN | $d_{N1}$ | $d_{N2}$ | | $d_{Ni}$ | | $d_{Nj}$ | | $d_{N(N-1)}$ | |

FIG. 5-1

TABLE 2

| Unique Mapping ID | Prediction ID | Weight (i.e. Frequency) | (i.e. Input Description) (i.e. Query) |
|---|---|---|---|
| ... | ... | ... | ... |
| $ID_{i1}$ through $ID_{iMi}$ left unchanged | $P_{i1} \rightarrow Clust_k$<br>$P_{ij} \rightarrow Clust_k$<br>$ID_{imi} \rightarrow Clust_k$ | $f_{i1}$ through $f_{iMi}$ left unchanged | $Q_{i1}$ through $Q_{iMi}$<br>$Q_{i1}$ through $Q_{iMi}$ |
| ... | ... | ... | ... |

FIG. 5-2

TABLE 3

| Unique Mapping ID | Prediction ID | Weight (i.e. Frequency) | (i.e. Input Description) (i.e. Query) |
|---|---|---|---|
| ... | ... | ... | ... |
| $ID_{i1}$ | $P_i$ | $f_{i1} \rightarrow nf_{i1}$ | $Q_{i1}$ |
| $ID_{ij}$ | $P_i$ | $f_{ij} \rightarrow nf_{ij}$ | $Q_{ij}$ |
| $ID_{iMi}$ | $P_i$ | $f_{iMi} \rightarrow nf_{iMi}$ | $Q_{iMi}$ |
| ... | | ... | ... |

FIG. 6

METHOD AND APPARATUS FOR ANALYSIS AND DECOMPOSITION OF CLASSIFIER DATA ANOMALIES

BACKGROUND OF THE INVENTION

The present invention generally pertains to machine learning classifiers. More specifically, the present invention pertains to methods and apparatus for analyzing classifiers and for facilitating clean-up of anomalies in classifier training data.

Machine learning classifiers are increasingly used in commercial software systems. One example is the search domain in which users enter short natural language strings (queries) and expect intent predictions. The search domain is highly competitive. Users are primarily drawn in by the relevance (accuracy) of the results. Advertising revenue is in turn related to the number of users, and thereby can be considered to be indirectly related to relevance. Therefore, it is highly desirable to have the machine learning classifier perform as well as possible.

Machine learning classifiers typically require training data to learn. The ability to learn from data is the main benefit of machine learning, but also makes this technology prone to data errors introduced either maliciously or by accident. The accuracy of a machine learning classifier is inextricably dependent upon the quality of the training data used to train the classifier. As noted, training data errors can be the result of malicious training data or can result by accident. An example of malicious errors in the case of classifiers trained using user feedback is the purposeful action by users to corrupt the data (i.e., by fraudulent clicks or "Google bombing"). Examples of accidental errors are human mistakes in the data labeling process.

Manual data labeling for use in training a machine learning classifier is expensive. To reduce the labor and corresponding costs, candidate mappings can sometimes be generated with unsupervised methods. However, human correction of these automatically generated mappings is also expensive in the absence of good data cleanup tools. Due to high costs, it is common for commercial systems to minimize or forego human review of their training data. The result is that many systems use just standard accuracy tests or metrics as shipping criteria, without more in-depth analysis of the data and accuracy.

Such an approach leads to the shipping of systems that are less accurate than they could be. Moreover, in the case of systems that get data from external sources, the systems are left exposed to malicious data attacks. The impact of the latter is not visible when only standard accuracy metrics are used as shipping criteria.

The present invention provides solutions to one or more of the above-described problems and/or provides other advantages over the prior art.

SUMMARY OF THE INVENTION

A human assisted method of debugging training data used to train a machine learning classifier is provided. The method includes obtaining a classifier training data set. The training data set is then debugged using an integrated debugging tool configured to implement a debugging loop to obtain a debugged data set. The debugging tool can be configured to perform an estimation and simplification step to reduce data noise in the training data set prior to further analysis. The debugging tool also runs a panel of prediction-centric diagnostic metrics on the training data set, and provides the user prediction based listings of the results of the panel of prediction-centric diagnostic metrics.

Other features and benefits that characterize embodiments of the present invention will be apparent upon reading the following detailed description and review of the associated drawings.

BRIEF DESCRIPTION OF THE DRAWINGS

FIG. 2-1 is a block diagram illustrating a machine learning component, a training data set, and a classifier analyzer used to debug the training data set to improve classifier performance.

FIG. 2-2 is a block diagram illustrating in greater detail the classifier analyzer shown in FIG. 2-1.

FIG. 2-3 is a block diagram illustrating steps of a general method which can be implemented using the classifier analyzer shown in FIGS. 2-1 and 2-3.

FIGS. 3-1 through 3-3 are screen shots of graphical user interfaces (GUIs) generated by the classifier analyzer to analyze and fix problems in the training data set.

FIGS. 5-1 and 5-2 are tables used to illustrate a method or algorithm for replacing predictions with their cluster ID.

FIG. 6 is a table used to illustrate a method or algorithm for normalizing frequencies.

DETAILED DESCRIPTION OF ILLUSTRATIVE EMBODIMENTS

The present invention includes methods and systems which facilitate manual data cleanup of machine learning classifier training data by dramatically improving productivity. A principled method for optimizing the size of the data window presented for human review, by prioritization based on cost-benefit (i.e. expected accuracy impact), is presented. Further, the present invention offers a measure of robustness to data errors, by allowing detection of abnormal patterns and facilitating a workflow in which the highest cost issues can be identified and solved first.

The present invention is particularly beneficial in scenarios in which data errors have significant effect on accuracy of a classifier, especially if the assumption of natural data is likely to have been violated. This can happen when the natural data is exposed to tampering or when natural data is unavailable (i.e. raw data is received from external unregulated sources, the system is under development, data is merged from different sources, data is generated using low accuracy bootstrap methods, and/or all or some of the training data is synthetic). Examples of such applications include:

Protection from malicious training data (e.g., "Google bombing") in the case of updateable or adaptable classifiers trained using user feedback (i.e. user click through).

Development stage of Machine Learning Classifiers, when:
  software bugs in the upstream code can propagate to the data;
  human annotators need to label data or correct mappings;
  The prediction vocabulary itself is under development. If the system developers have some control over the prediction vocabulary (as is the case in Desktop Search over Help articles) they can reduce the overall entropy, and improve accuracy, by merging ambiguous tasks.

It is known that cleanup of the training data often yields higher accuracy gains than improvements in the machine learning algorithms. This invention is useful by providing:

Accuracy gains as a result of training on cleaner data.

Decreased production costs—The expected productivity gains are highest for high dimensionality vocabularies for which training data is very hard to manage manually.

Robustness in relation to data anomalies (i.e. malicious data).

The potential of tracking data errors back to problems in the upstream process

The present invention can be used with different classifier types and domains as a general purpose method to be used when developing machine learning classifiers.

I. Exemplary Environments

Prior to discussing embodiments of the present invention in detail, exemplary computing environments within which the embodiments and their associated systems can be implemented will be discussed.

Figure 1:
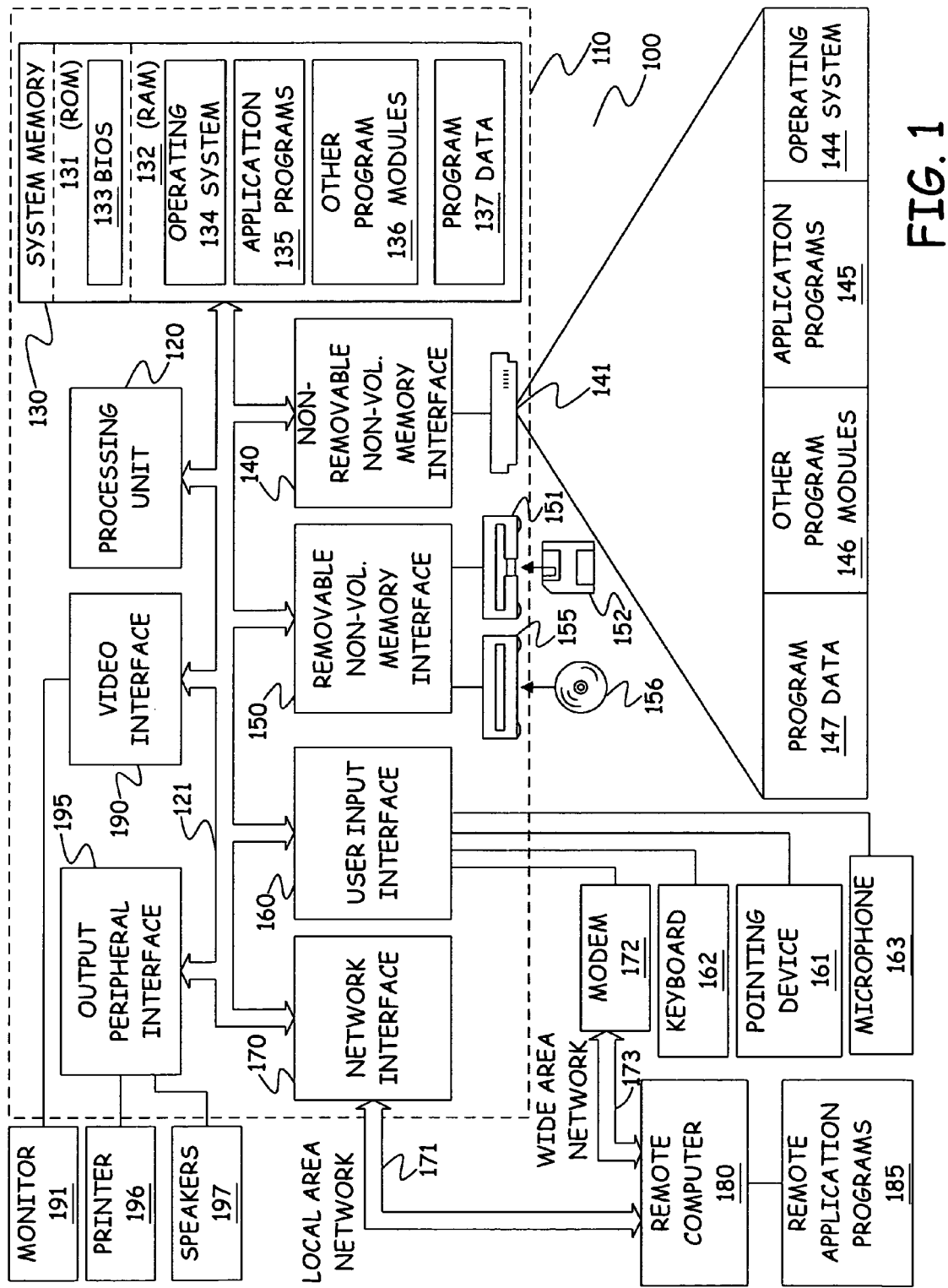
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. Definitions

Most of the terms defined in this section are standard machine learning terms. Some of the terms are specific to the Search over Assistance Content domain. As used in this section, an asterisks (i.e., "*") designates these domain-specific terms. The ":" symbol designates and precedes the introduction of synonyms and alternative terms.

Classifier=a software component that accepts unlabeled (unseen) instances as inputs and returns discrete prediction classes. Classifiers must be trained on labeled instances prior to being used on unlabeled (unseen) instances : sometimes used interchangeably with classifier model : short for Statistical Machine Learning Classifier Training=the process by which a classifier model is generated from a training data set. A training data set comprises instances that have been mapped (labeled) to "known-good" predictions : build (*domain-specific)

Instance=the classifier's input : record, example, feature vector : query, natural language query, input description (*domain-specific) : sometimes used interchangeably with mapping Prediction=The discrete category to which an instance belongs. The classifier's function is to predict the discrete category (prediction) to which an instance belongs : class, prediction class : task, intent prediction (*domain-specific)

Labeling=the process of associating an instance to the correct prediction. When the process is carried out by humans (usually trained personnel familiar with the domain) it is typically referred to as manual data labeling. : mapping Weight=a number that reflects the relative influence of a particular mapping compared to other mappings in the training data set. The weight will be used by the classifier training process that "learns" from the mappings. In the Search domain the natural way to assign a weight (or influence) to a mapping is to use the frequency of the mapping as a weight. The frequency of the mapping can be derived from query logs (directly or using heuristics to infer user's selection of a particular prediction given a particular query). The more frequent a particular mapping is the more weight it will have. However, other methods can be used to compute the weight and the weight does not have to be an integer number. : used interchangeably with Frequency, even though the two are not always synonyms Prediction Weight=For a given prediction, the Prediction Weight is the sum of weights for all instances mapped to this prediction. An algorithm for computing the Prediction Weight is to take all mappings that map to that prediction and sum-up their weights: alternate term Prediction Total Frequency Data set=A schema and a set of instances matching the schema. In the present invention, the schema comprises a prediction ID, a weight and an input description.

Training data error=incorrect or missing items in the training data set. Errors can include either instances mapped to the wrong prediction or instances containing incorrect features or missing mappings. The present invention is designed to help correct data error. : used interchangeably with data noise : poorly mapped training data : incorrect mappings Prediction vocabulary=the set of prediction classes associated with a particular classifier model Feature=a quantity describing an instance. An instance comprises one or more features and is also known as a feature vector : attribute, attribute-value-pair : query word (* embodiment specific)

Feature vocabulary=the set of features associated with a particular classifier model Vocabulary dimensionality=the number of elements in a vocabulary. For example, a spam detector has a very low dimensionality prediction vocabulary (only two predictions)

Accuracy (error rate)=The rate of correct (incorrect) predictions made by the classification model over a test data set. Accuracy is usually estimated by using an independent test set that was not used in training.

Evaluation=the process of computing the accuracy (error rate) of a classifier on a test data set by comparing its predictions with the "known-good" predictions in a labeled data set. Evaluation can also include other quality-assurance procedures besides accuracy computation Train/test split=the process of randomly partitioning a data set into two subsets, one for training (usually the larger subset) and one for testing (usually the smaller subset). The train/test split allows both training and the "preservation" of an independent test data set—that was not used in training Test data=A data set used for estimating accuracy: Also known as holdout data because the test data set is sometimes a subset of the data that was "held out"

Accuracy regression=A testing procedure in which the accuracies of two consecutive versions of a classifier are compared against each other—to prevent significant degradation in accuracy from one version to another Failed query=An instance for which the classifier returned an incorrect prediction : misclassification Top 10 training error=a particular case of top N classification error Top N classification error=this term is meaningful (for values >1) for classifiers that return an ordered list of predictions classes, in decreased order of confidence. The confidence is the likelihood that the prediction is the correct prediction for the given instance. A Top N misclassification is a case in which none of the top N results returned by the classifier is the correct one. Thus the number of Top N errors will always be lower than the number of Top 1 errors.

Training error=the error rate when the training set is used as a test set. Also known as re-substitution error. This error is not an accurate measure of the true classifier error (also known as generalization error). Training error is an optimistic (low) estimate of the true error. Training error is useful in diagnosing noise in the training data.

Data noise=In the present implementations, data noise is a milder form of training data error. Besides obviously incorrect mappings, data noise includes other data anomalies that can cause reduced accuracy—without being incorrect. The present invention specifically addresses two types of data noise: distribution skewness and ambiguity/confusion : used interchangeably with training data error.

Data simplification=*domain-specific term designating a step in the present invention. This step replaces the original training data set with a new data set. The purpose of data simplification is to reduce two common types of data noise (distribution skewness and ambiguity), reducing the training error rate. Reducing noise allows uncovering of other more insidious errors that would have otherwise been left undiscovered. Data simplification is described in further detail below: alternate terms noise reduction, data pre-cleaning Data cleanup=The process of improving the quality of the data by modifying its form or content. The present invention is a particular case of data cleaning : data clean-up, data cleaning Distribution skewness=A situation in which the statistical distribution of the Prediction Weights (or Prediction Total Frequencies) is strongly biased, skewed, not following the Pareto principle. Distribution skewness is a form a data noise. If the skewness reflects the natural distribution then it not an error—however it can negatively influence the accuracy of the classifier. Some machine learning algorithms, such as Naïve Bayes are more sensitive to skewness than others (in the case of Naïve Bayes, skewness affects the prior probability of the prediction).

Prediction ambiguity=A situation in which a pair—or a group, also known as cluster—of predictions are often confused with each other: confusion Confusion matrix=A matrix showing the predicted and actual prediction classes. A confusion matrix is of size N×N, where N is the number of different prediction classes. The precision matrix can be used to compute a measure of prediction ambiguity (confusion). The value in element $i*j$ of the matrix is the number of times prediction i and j were confused by the classifier.

Distance=distance between two predictions, used to estimate the ambiguity (confusion) between predictions.

Cosine distance=one of several possible standard distances that can be used. It is computed as a cosine between the feature vectors. Not explained in detail because it is a standard machine learning concept and because it is not the only distance that can be used in embodiments of the present invention—it is merely an example. Any distance can be used as long as it is a measure of the classifier's likelihood to confuse the two predictions (the smaller the distance, the greater the likelihood of confusion).

Distance matrix=A matrix similar to the confusion matrix but in which the value in element $i*j$ is the distance between the two predictions (computed using a distance metric such as the cosine distance).

Prediction cluster=a group of predictions whose relative distances are smaller than a certain (configurable) threshold Clustering=the process of creating prediction clusters based on the distance matrix. Any clustering algorithm can be used—as long as the generated clusters contain predictions that are "closer" to each other than predictions that are in different clusters ("close" from the point of view of the distance metric used). An example of clustering is hierarchical clustering (for example bottom-up greedy clustering). The concept of clustering is not described in detail because it is a standard machine learning concept and because it is not the only algorithm that can be used—it is merely an example.

Prediction neighbors=related predictions that are part of the same Prediction cluster Disambiguation=the procedure for reducing the ambiguity (confusion) between two predictions by editing the data. Disambiguation is recommended in the case in which the ambiguous predictions are quite distinct semantically but are being confused because of errors in the training data (i.e. not enough data, not enough data containing disambiguating features, skewed weights for certain mappings).

Metric=Any measure that takes the data set as an input and returns an array of values—that can be displayed in a table (or spreadsheet format). If one of the columns is the prediction ID then the metric is said to be prediction centric. The metric is called pluggable because any metric that conforms to this input/output format (API interface) can be "plugged into" systems embodying the concepts of the present invention : diagnostic, diagnostic metric, pluggable metric : prediction-centric test Debugging=The process of removing errors from a software component. In this document, the term is used to refer to the process of incrementally removing errors from the training data set.

Entropy=a standard measure of ambiguity.

Vocabulary hole=a situation in which a feature or a prediction is not recognized by the classifier because it was not present in the training data. Vocabulary holes can be one of the causes of misclassification (failed queries) : related to out of vocabulary (OOV)

Natural data=used to designate data that is realistic. In the Search domain, natural data is data that reflects the real mapping between a natural search query (an instance) and the user's intent to perform a task or surface a help topic (prediction class). Since the user's intent is not easily accessible, query logs (on which user intent can be inferred using various methods such as click stream analysis) can be used. When available, explicit feedback from the user (in which the user explicitly answers whether he was content with the result returned by the system) can be used.

Synthetic data=Used in contrast to natural data. Refers to data that has been generated rather than collected from the real world.

Search analyst=The user of the systems of the present invention. A professional who handles classifier training and data cleaning in the Search over Assistance Content domain. (*domain-specific).

Unsupervised learning=Unsupervised learning signifies a mode of machine learning where the system is not told the "right answer"—for example, it is not trained on pairs consisting of an input description and the desired prediction.

Feature selection=a standard machine learning procedure.

III. Classifier Training Data Clean-Up

Figures 1, 2:
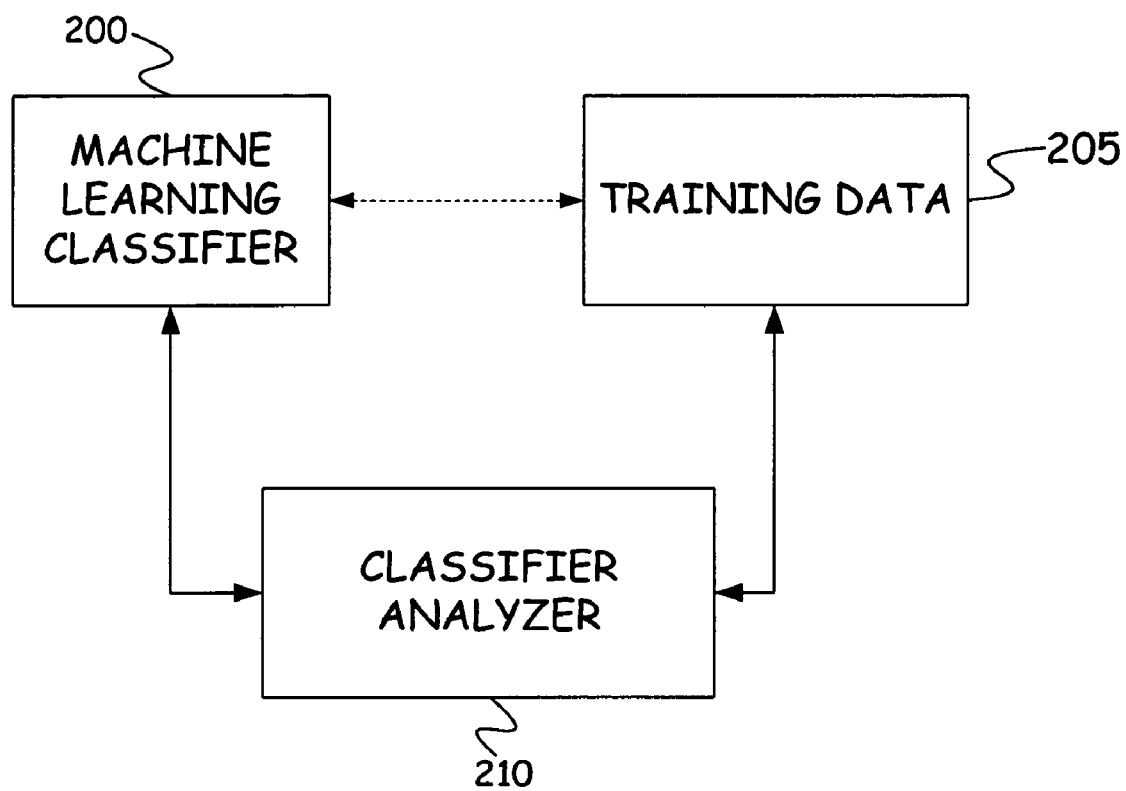
Figure 2:
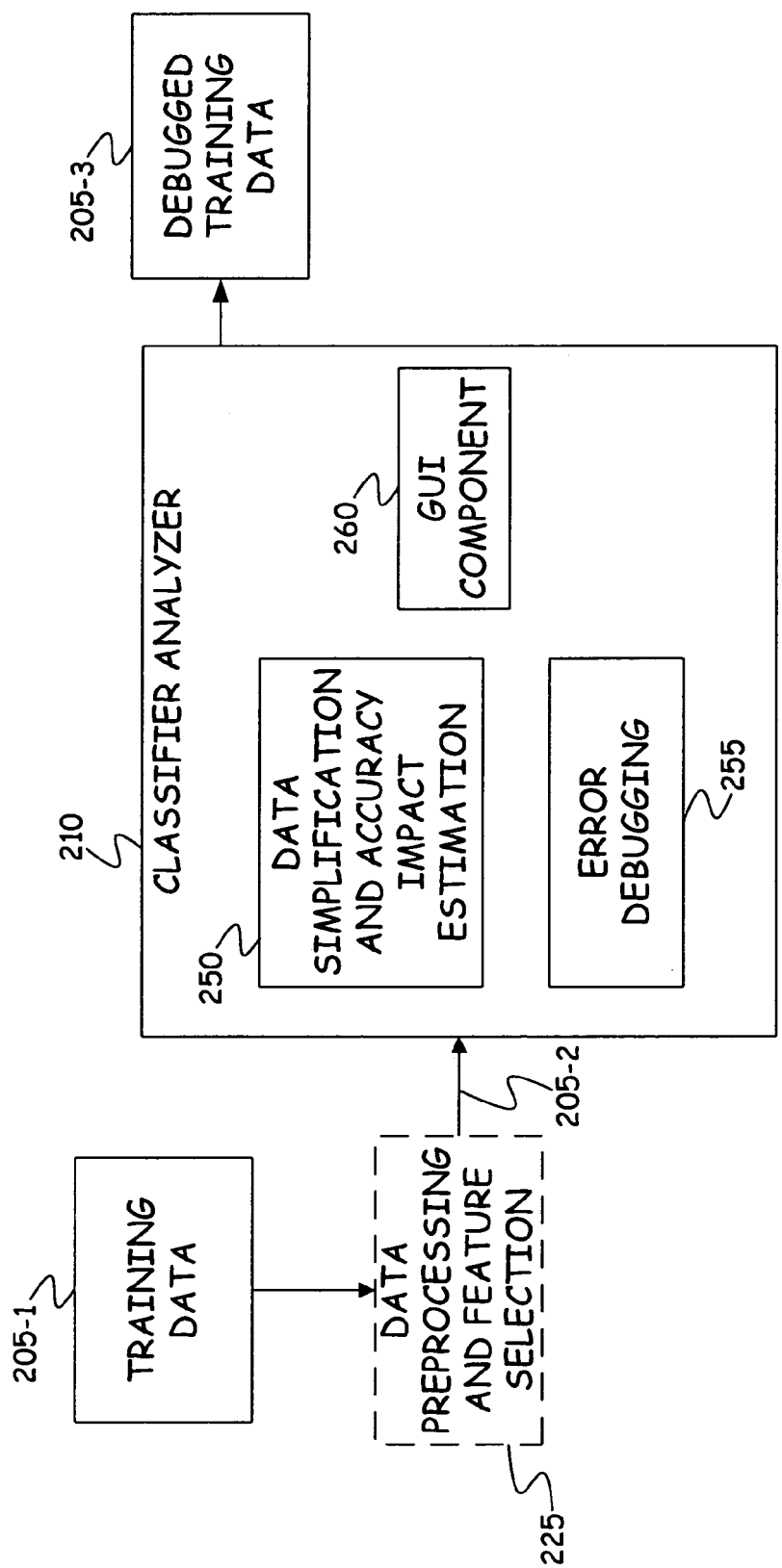

FIG. 2-1 illustrates a machine learning classifier 200 of the type known in the art which is trained using training data 205. The present invention includes a principled method for semi-automated training data clean-up, as well as a tool or system that applies the method in the help search domain where the classifier accepts a user query as input and returns an intent-prediction. The method of the present invention can be used to minimize the classifier error rate at a low cost. This is accomplished by focusing on eliminating data noise and helping to diagnose incomplete data (unsaturated data which still has vocabulary holes). The tool used to implement the method of the present invention is illustrated in FIG. 2-1 as classifier analyzer 210. The tool and method are extensible via pluggable metrics. Classifier analyzer 210 implements the methods of the present invention to generate an improved set of training data which results in more accurate operation of machine learning component 200.

FIG. 2-2 is a block diagram illustrating aspects of the classifier analyzer 210 and corresponding methods in greater detail. Classifier analyzer 210 receives as an input a version 205-1 of training data which requires clean-up to improve performance of the classifier 200. Classifier analyzer 210 provides as an output, or helps to generate, an updated or debugged set of training data 205-3. When trained with debugged set of training data 205-3, classifier 200 generally provides improved accuracy. If desired, standard data preprocessing (i.e. case and space normalization, spelling, and lemmatization) and feature selection can be applied before (or in conjunction with) the methods implemented by classifier analyzer 210. The data preprocessing and feature selection functions are illustrated in FIG. 2-2 at module or component 225 resulting in a preprocessed/feature selected set of data 205-2, and can be applied via the pluggable metrics described below.

The format of the training data is, in some exemplary embodiments, an input file in which every record represents a mapping—and is a triplet containing a prediction ID, a weight and an input description (i.e. a user query in the case of text-based search). Although useful in a wide variety of training data scenarios, the methods of the present invention are most useful when some or all of the following assumptions are true:

The training data was generated using an approximate process such as user click through, a bootstrap method or manual labeling.

The training data is noisy (contains incorrect mappings or is ambiguous) and might be unsaturated (be incomplete, have vocabulary holes).

The data is still noisy after standard procedures such as feature selection have been applied. Noise can be readily diagnosed by a high number of training errors.

In accordance with certain aspects of the present invention, the disclosed method includes the steps of loading the input training data set 205-1 (or preprocessed data set 205-2) in a format similar to the one described above, and diagnosing and fixing data issues in the input training data set 205-1 to generate the debugged data set 205-3. For the sake of simplicity, three types of data noise to be corrected using the method of the present invention are identified as:

1. Distribution skewness—query strings are correct but the frequencies are skewed in a manner that might lower accuracy.
2. Ambiguity—groups of predictions are confused with each other due to feature overlap.
3. Other types of errors such as invalid, garbage data (i.e. caused by incorrect tokenization of strings, data preprocessing bugs or other errors in the upstream process).

Figures 2, 3:
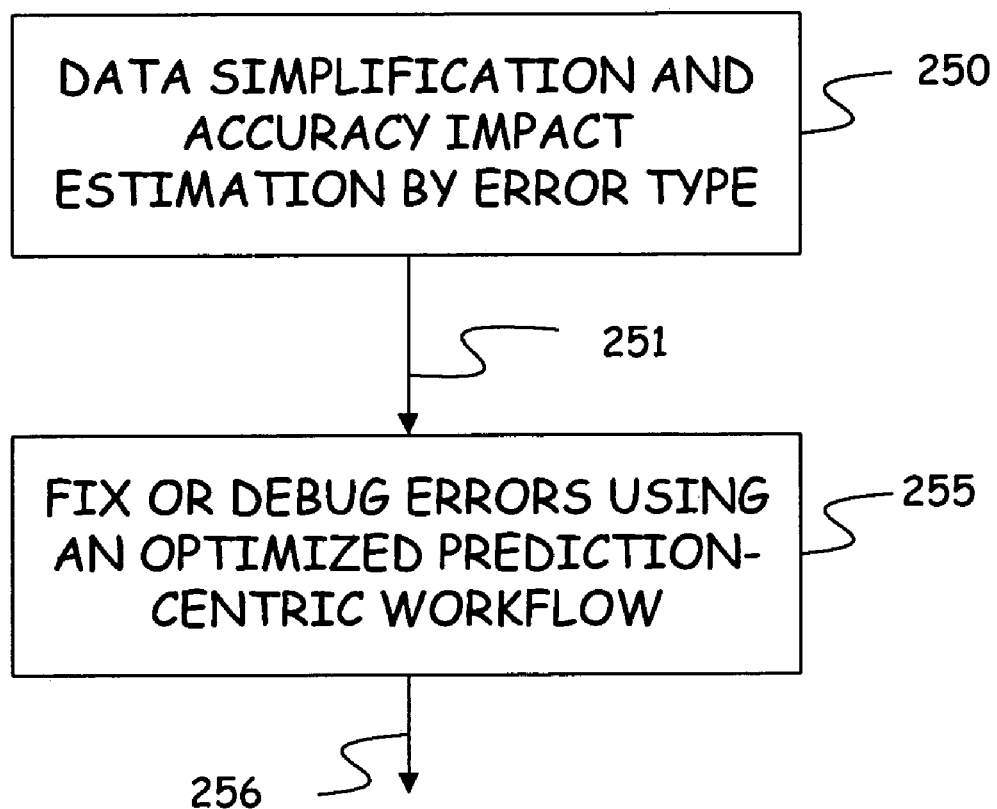
Figures 1, 3:
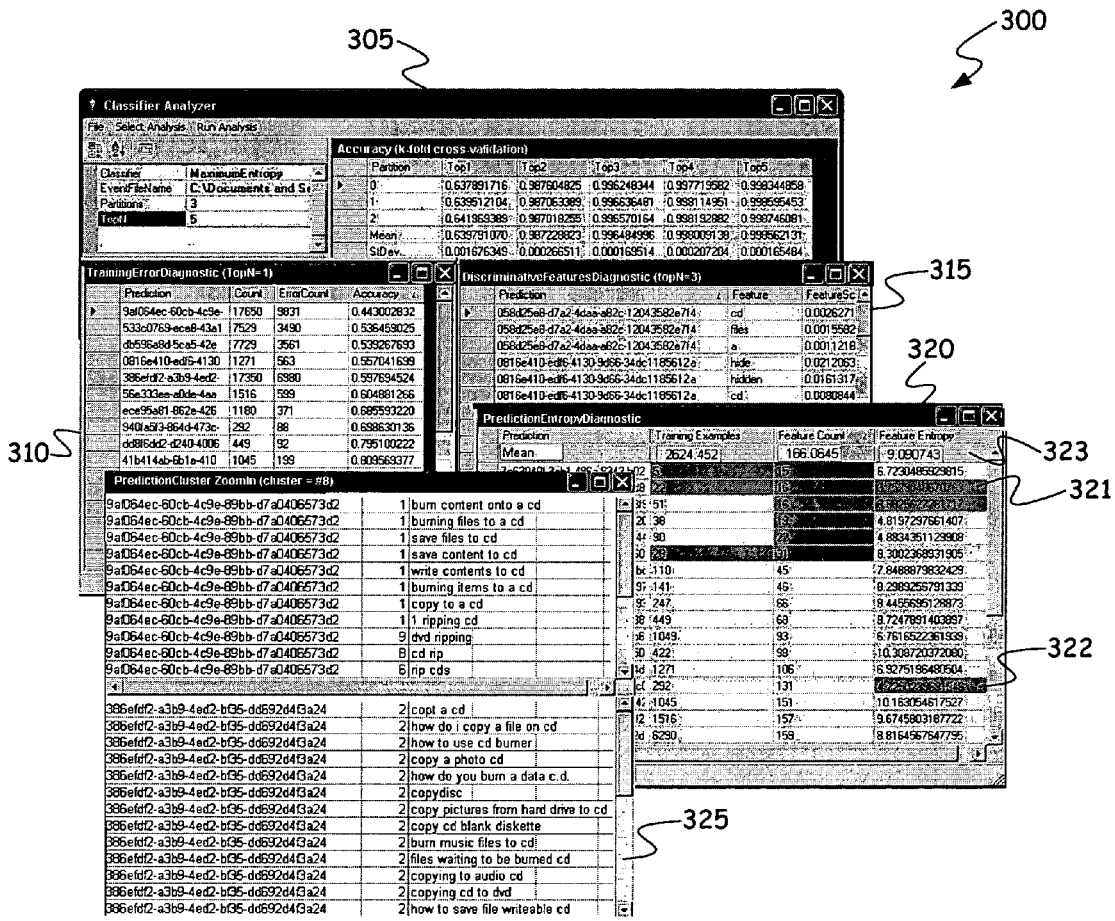
Figure 3:
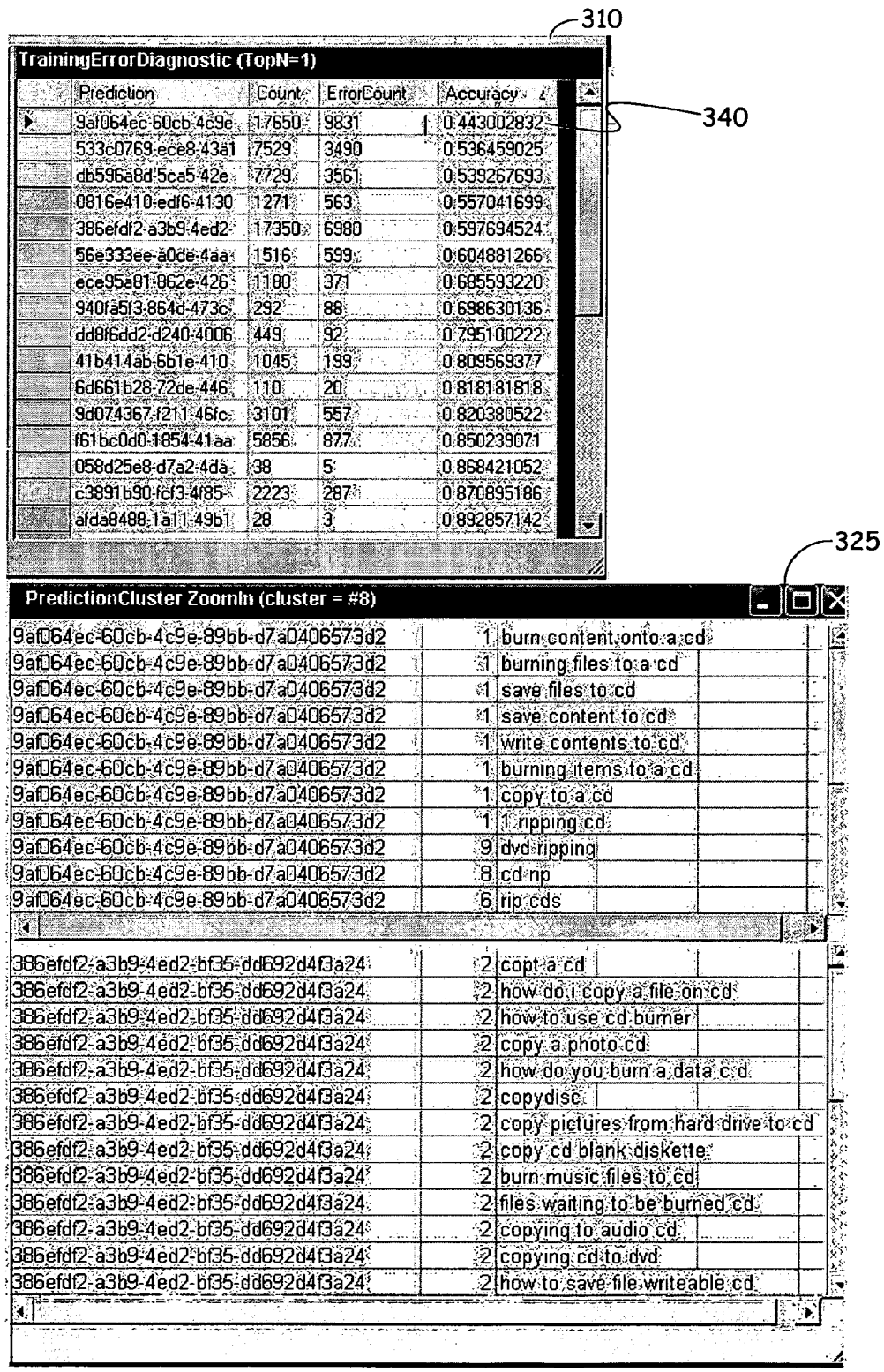

As will be described in greater detail, the present invention uses new GUI formats to aid in the efficient display and debugging of the training data. In FIG. 2, classifier analyzer 210 is shown as including a GUI component 260 which generates these GUIs on a display device. In accordance with some embodiments of the present invention, the method includes two conceptual stages. These stages are illustrated in FIG. 2-3 (and as components, modules or functions of analyzer 210 in FIG. 2-2), and include:

1. High level data simplification and accuracy impact estimation by error type. This step (shown at 250 in FIG. 2-3) is optional, but can be recommended especially if the initial training error rate is very high. In this case, simplifying the data set can bring the training error down to a more manageable value.
2. Debugging (fixing) errors using an optimized prediction-centric workflow. This step is illustrated at 255 in FIG. 2-3.

Debugging Stage

The debugging step or stage 255 is described first because it is central to the workflow. The input of this stage is a data set. It can be the original data set 205-1 (if the error rate is low enough to be manageable), the preprocessed data set 205-2, or the simplified data output 251 by the estimation and simplification stage 250 shown in FIG. 2-3. The output 256 of the debugging stage is a cleaned up data set—the result of the user running various metrics, navigating through and fixing individual errors.

The characteristics of this stage or step include the following sub-steps:

Prediction-centric tests: A panel of prediction-centric tests (metrics) are run on the training data. Existing tests which can be implemented in this step include determining accuracy per prediction, number of mappings, number of features, and entropy measures. The panel of tests is extensible—via pluggable metrics.

Prediction-based display of metrics: After the panel of prediction-centric tests or metrics are run, a graphical user interface (GUI) is used to provide prediction-based display of the metrics, with sorting and filtering capabilities, and with outliers highlighted to aid the developer or user of the system in efficiently identifying problems that, when corrected, are likely to have significant effect on the quality of the training data. This step can also include the display of a summary metric (averaged or total value across all predictions for various metrics).

Configurable "failed query" window. In accordance with other aspects of the present invention, in some embodiments the GUI is configured to include a failed query window, with the number of items in the failed query list being configurable based on error type and on maximum size (i.e. can be limited to displaying top 10 training errors, or only to errors due exclusively to confusion, or to displaying at most 1000 errors, etc.). The GUI highlights (i.e. color codes) the failed queries by failure cause. Also, for each failed query, the GUI displays the identified probable cause of the failure (i.e. out of vocabulary features versus confusion, etc).

The GUI provides navigation back to source mappings (from both the "failed query" view and the metric view).

The GUI highlights out-of-vocabulary features.

The system determines the overall accuracy for two consecutive versions of the data after debugging cycles, and the GUI displays a comparison between the overall accuracies of these two consecutive versions of the data. If the prediction sets of consecutive versions are different, due to the prediction set being under development, the accuracy comparison report is broken down by prediction sub-sets.

Estimation and Simplification Stage

The characteristics of this stage or step 250 include the following sub-steps:

estimating the accuracy impact by error category complexity management (data simplification)—by performing hypothetical fixes In this stage errors are fixed automatically, allowing rough upper-bounds estimation of their impact on the training error. The output of this stage includes two percentages (accuracy hit due to ambiguity, accuracy hit due to distribution) and a "simplified" data set—which has a lower training error than the original set. In one embodiment of the present invention, "ambiguity" occurs when there are two or more prediction classes whose members are frequently misclassified as belonging to one of the other prediction classes in the ambiguous set. Remedying this problem via the process of "simplification" (to produce a simplified data set) involves combining the prediction classes, under the premise that the classes may actually not have meaningful distinctions. This eliminates the misclassification errors resulting from the ambiguity. Also, in accordance with some embodiments of the present invention, the problem of ambiguity can be remedied using the process of "disambiguation", which is the modification of mappings on one, the other, or both prediction classes to ensure that they are no longer ambiguous to one another.

In this stage, predictions are clustered using a standard distance (i.e. cosine), then all predictions in the same cluster are replaced with the cluster ID—and the training error is recomputed on the "simplified" set. The difference between the two accuracies is the rough "accuracy percentage" hit attributed to ambiguity. An algorithm for replacing predictions with their cluster ID is described below in Appendix A.

To estimate the effects of distribution skewness, the frequencies are normalized so that all predictions have the same overall frequency. An algorithm for normalizing frequencies is described below in Appendix B. The normalized data set is used as a test set for re-computing the error on the original training data set. Then, the training error is computed on the normalized data set (this set is used as both a training and a test set). The difference between the two accuracies is the rough accuracy percentage hit attributed to distribution skewness.

At the end of the simplification stage, the result is a simplified data set with a new, lower, training error. A user of the system will also have a rough idea (through the two percentages) of what causes the largest accuracy hit. Also, as a result of this stage a list of prediction clusters are generated for viewing, which a human annotator can review.

If there is control over the prediction vocabulary, then the hard to discriminate predictions (or the way they are presented to the user) can be optimized so that clusters of semantically related predictions are merged—and surfaced with higher precision. In case there is no control over the prediction vocabulary or merging predictions is no an acceptable solution, the human annotator can at least continue to work on a simplified data set—in which "real" data errors are not obscured by semantically ambiguous predictions.

For example, two predictions could be quite distinct semantically—but confused by the classifier due to insufficient/incorrect mappings. In such a case, the human annotator should fix the "real" data errors rather than merging the predictions. The idea is that humans can review clusters—merge is better if predictions are indeed hard to discriminate. Disambiguation is better if the confusion between predictions is due to bad/insufficient mapping (it's one of the possible "real" data errors)

FIGS. 3-1 through 3-3 illustrate one implementation of graphical user interfaces (GUIs) 300 for the panel of prediction centric diagnostics discussed above (a.k.a. tests or metrics) that a search analyst can use to diagnose the classifier. In the illustrated embodiment, the GUIs 300 include a main window 305 which summarizes the prediction centric diagnostics. At any point, the user can have multiple windows open, each containing the results of one diagnostic. See for example windows 310, 315 and 320 entitled "TrainingError-Diagnostic (TopN=1)", "DiscriminativeFeaturesDiagnostic (TopN=3)" and "PredictionEntropyDiagnostic", respectively. Using an input device such as a mouse, the user is be able to navigate between the windows, sort any individual window by column values, re-run the diagnostic with different input arguments, etc. She can also click on or select a particular prediction within one of the diagnostic windows to go to the source mappings for that particular prediction and its "neighbors" (related predictions that have similar vocabularies). See for example the window 325 entitled "PredictionCluster ZoomIn (cluster=#8)." The zoom-in window 325 is editable, allowing the search analyst to fix erroneous mappings.

FIG. 3-1 also illustrates the above-described aspect of some embodiments of the present invention in which statistical outliers are highlighted or color coded. See for example the shaded values 321 and 322 in the "PredictionEntropyDiagnostic" window 320. This window also demonstrates the aspect of displaying Summary (Mean/Standard Deviation) values (see row 323) in the window. In FIG. 3-1 and the other FIGS., other columns such as "Task Title" can be added as desired to improve ease of use. In some embodiments, a "Task Title" column can be included in place of, or in addition to, the column illustrating identification numbers ("IDs" or "GUIDs"). Such additional or alternative columns are omitted here to simplify the illustration of the GUI concepts of the present invention.

Referring now to FIG. 3-2, shown in greater detail is "PredictionEntropyDiagnostic" window 320. In FIG. 3-2, it can be seen that the GUIs of the present invention include the display of summary values (e.g., values 330, 331 and 332) for each column representing a feature or a feature characteristic. FIG. 3-2 also illustrates the sorting feature, in this example the window being sorted by the "FeatureCount" column. Also illustrated is the aspect of the present invention in which outliers are highlighted, both for sorted and unsorted columns. Outliers are values that are statistically far (or farthest) from the mean value, and are the mappings that should be investigated first when cleaning up a training data set. For example see highlighted training examples entry 333. In this case, five training samples is most likely not enough to achieve good accuracy, and these predictions should therefore be reviewed or deleted.

Referring now to FIG. 3-3, shown is the window 310 entitled "TrainingErrorDiagnostic (TopN=1)" and the window 325 entitled "PredictionCluster ZoomIn (cluster=#8)." To invoke ZoomIn window 325, the user clicks on a prediction in window 310, in this example the prediction 340 with the lowest accuracy (a 56% training error). The ZoomIn window 325 allows the user to have a closer look (more detail displayed) at the prediction and its neighbors.

An example of the workflow using the methods and tools of the present invention is now provided. For example, the process of analyzing or debugging a training data set begins with the initiation of the classifier analyzer 210 application and opening of corresponding GUIs. For example, upon initiation, window 305 shown in FIG. 1 can be displayed. The classifier analyzer runs basic accuracy tests and displays the results in window 305.

Next, if the accuracy is below a certain threshold (which can be tuned or adjusted), the panel of prediction centric tests is run—by the user or automatically. Then, the user browses through the various diagnostic windows and sorts/filters them in order to see which of the predictions should be looked at first. As noted above, the user can click or select to "zoom into" the source mappings for a particular prediction and fix these mappings if needed.

Next, the user can rerun the tests until the quality goal is reached. Any changes made to the data during a diagnostic (a.k.a. debugging) session are "staged" before being rolled into the next version of the classifier. These changes are only accepted if they improved accuracy.

Note that editing source mappings in a zoom-in window is not the only way to change the classifier data. In alternatives, the user can also 1. Import new mappings in bulk by clicking an Import button.
2. Accept all or some of the hypothetical fixes described previously.
3. Manually add new mappings.
4. Modify prediction IDs (i.e. merge predictions, delete predictions, etc).

Figure 4:
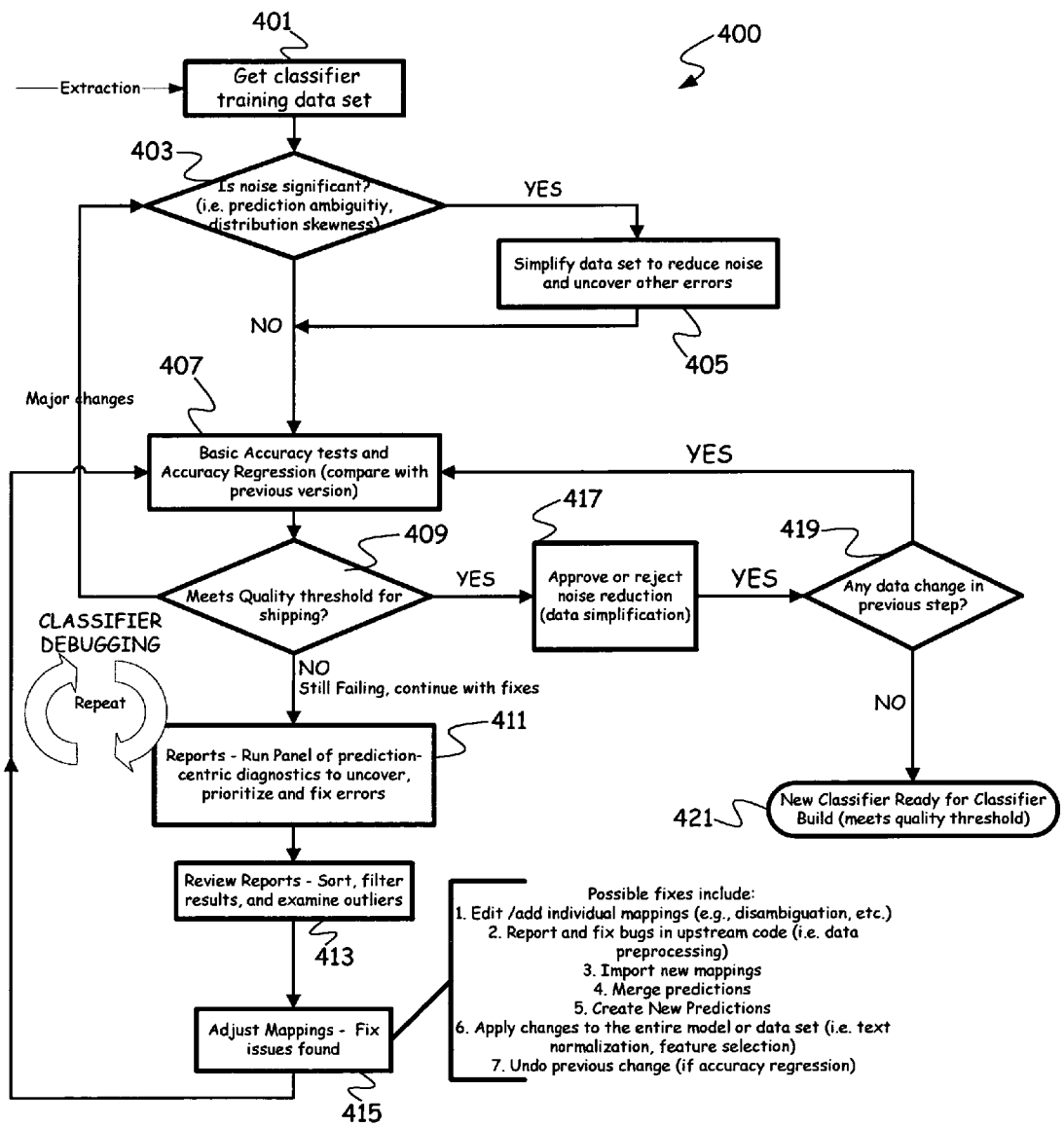
FIG. 4 is a flow chart illustrating a more particular embodiment of a method of the present invention.

Referring now to FIG. 4, shown is a flowchart 400 representing in greater detail the example embodiment of the methods of the present invention. At step 401, the classifier training data set is obtained or loaded, for example by extracting it from a learning store or retrieving it from other sources. At step 403, a determination is made as to whether significant noise exists in the training data set. Examples of types of noise include prediction ambiguity and distribution skewness. If significant noise does exist in the data set, at step 405 the data set is simplified to reduce the noise and uncover other errors. This step corresponds to the step 250 described above, and can be implemented automatically by analyzer 210. The result of this step is simplified data output (e.g., data output 251 shown in FIG. 2-3).

Next, at step 407, basic accuracy testing is performed as described above on the training data set (or on the simplified training data set output from step 405). This step can include the comparison of the test results with test results for previous versions of the training data. If after the basic accuracy testing it is determined at step 409 that major changes have been made at step 405 (or elsewhere as described below), then the method can return to step 403 to determine if the noise is significant in the training data. If at step 409 it is determined that the training data (and the classifier trained with that data) does not meet a quality threshold (e.g., maximum number of errors, etc) for shipping, then the method proceeds to step 411 at which the panel of prediction centric tests described above is run to uncover, prioritize and fix errors. This step corresponds to error debugging step 255 described above.

Also corresponding to the error debugging step and to the GUIs illustrated in FIGS. 3-1 through 3-3 is step 413 illustrated in FIG. 4. In this step, the reports or results from step 411 are reviewed, sorted filtered, etc. The GUIs facilitate the convenient and fast review of this information, as well as the efficient review of outliers. Then, at step 415, for any data issues which have been found, corresponding mappings in the training data set are adjusted. Examples of these adjustments or fixes are illustrated in FIG. 4. The process then repeats itself, returning to step 407 until it is determined at step 409 that the quality threshold for shipping has been met.

When it is determined at step 409 that the quality threshold for shipping has been met, the process proceeds to step 417 where a determination is made to approve or reject noise rejection changes to the data set made in simplification step 405. Then, if any data has changed in the previous steps as determined at step 419, the process repeats itself, returning to step 407. When at step 419 it is determined that no data has changed in the previous steps, the process is completed at 421 and the new classifier is ready for a classifier build. In other words, the training data and classifier meet quality thresholds (step 409).

Although the present invention has been described with reference to particular embodiments, workers skilled in the art will recognize that changes may be made in form and detail without departing from the spirit and scope of the invention.

Appendix A

An algorithm for replacing predictions with their cluster IDs can be described as follows.

1. Compute Distance Matrix: For every pair of predictions compute a distance and fill a Distance Matrix with these values. An example of a distance matrix is illustrated at Table 1 of FIG. 5. As explained above in the Definitions section, a variety of different distances can be used. In some exemplary embodiments the cosine distance can be used as long as the distance is a measure of the likelihood that the classifier will confuse the two predictions (the smaller the distance the greater the likelihood of confusion). In some other embodiments a symmetrized confusion distance (from the confusion matrix) can be used.
2. Cluster the predictions (group the predictions into clusters): As explained in the Definitions section, a variety of clustering algorithms can be used as long as the clustering criteria is the distance described above (the smaller the distance between two predictions the greater the likelihood that they will be in the same cluster. Clusters do not overlap—they are disjoint sets). Generate mappings between a prediction ID on one hand and the cluster ID on the other and use this mapping to replace the prediction with its corresponding cluster (in the training data file). If N is the total number of predictions, then the mappings from predictions to clusters can look, in some embodiments, like in the example shown below, where $P_1$ is part of $Clust_m$ and $P_1$ is part of $Clust_k$. As an optimization, predictions that are contained in trivial (one-prediction) clusters do not need a mapping because they can be represented by a "trivial" mapping which can be omitted (the prediction ID maps to itself). Due to the nature of clustering there will be fewer clusters than predictions.

| PredictionID | ClusterID |
|---|---|
| $P_1$ | $Clust_m$ (which might contain, for example, predictions $P_1$, $P_{503}$ and $P_{2001}$) |
| ... | ... |
| $P_i$ | $Clust_k$ (which might contain, for example, redictions Pi and Pj) |
| ... | ... |

3. For each prediction cluster replace prediction IDs with their cluster ID. The training data file is shown in FIG. 5-2 in a table format (Table 2). The training data file can be stored in other different formats including, but not limited to, plain text files and database. The rows of Table 2 show the transformation for a particular record in the data set. After replacing all Prediction IDs with their corresponding clusters (as shown in Table 2 by the arrow sign ->), the resulting data set will contain fewer, less ambiguous predictions.

Appendix B

An algorithm for normalizing frequencies can be described as follows. A training data file is illustrated in table format (Table 3 of FIG. 6). However, the training data file can be stored in other formats including, but not limited to plain text files and databases.

Let N be the total number of prediction classes, and let $M_i$ be the total number of mappings for prediction $P_i$. The algorithm then includes the following steps:

1. Sort the data set by prediction ID as shown in Table 3. This way, all of the mappings for one prediction are grouped together.

2. Compute the Prediction Weight $F_i$ (Prediction Total Frequency) for each prediction by adding the frequencies for all the mappings associated with the prediction $F_i$ as defined in Equation 1.

$$F_i = \sum_{j=0}^{j<M_i} f_{ij} \qquad \text{Equation 1}$$

Compute total frequency F across all predictions using the relationship illustrated in Equation 2.

$$F = \sum_{i=0}^{i<N} F_i \qquad \text{Equation 2}$$

3. The normalized weight for mapping $nf_{ij}$ (shown in Table 3) will be as illustrated in Equation 3.

$$nf_{ij} = \frac{F}{n * F_i} f_{ij} \qquad \text{Equation 3}$$

Replacing $f_{ij}$ -> $nf_{ij}$ as shown in Table 3, and doing the same for all values in the data set, the result is a "frequency normalized" data set in which each of the N predictions will have a the same Prediction Weight of $$\frac{F}{n}.$$

What is claimed is:

1. A human assisted method, implemented with a computing device, of debugging training data used to train a machine learning classifier, the method comprising:

obtaining a machine learning classifier training data set, wherein the machine learning classifier training data set comprises data instances mapped to predictions for those data instances, wherein each of the data instances comprises a data triplet containing a prediction ID, a weight, and an input description;

evaluating potential errors in the data set according to one or more prediction-centric metrics;

displaying one or more of the potential errors in the data set along with one or more of the metrics in a format that is user-configurable with reference to one or more of the metrics; and debugging the machine learning classifier training data set using an integrated debugging tool configured to implement a debugging loop, including removing one or more of the potential errors in the data set, to obtain a debugged machine learning classifier data set for use in training a machine learning classifier.

2. The method of claim 1, wherein debugging the machine learning classifier training data set using the integrated debugging tool further comprises:

determining with the integrated debugging tool whether data noise in the machine learning classifier training data set exceeds a threshold; and performing an estimation and simplification step, with the integrated debugging tool, on the machine learning classifier training data set if the data noise in the machine learning classifier training data set exceeds the threshold to obtain a simplified training data set.

3. The method of claim 2, wherein the data noise is a distribution skewness type of data noise.

4. The method of claim 2, wherein the data noise is an ambiguity type of data noise.

5. The method of claim 2, wherein the step of performing the estimation and simplification step, with the integrated debugging tool, further comprises identifying hypothetical fixes to the machine learning classifier training data set and estimating effects of the hypothetical fixes on training data errors.

6. The method of claim 5, wherein the step of identifying hypothetical fixes to the machine learning classifier training data set and estimating effects of the hypothetical fixes on training data errors further comprises reducing data errors in the machine learning classifier training data set caused by at least one of distribution skewness and ambiguity, thereby exposing other types of data errors in the machine learning classifier training data set.

7. The method of claim 1, wherein debugging the machine learning classifier training data set using the integrated debugging tool further comprises:
running a panel of prediction-centric diagnostic metrics on the machine learning classifier training data set; and
providing to a user prediction based listings of the results of the panel of prediction-centric diagnostic metrics.

8. The method of claim 7, wherein the step of providing to the user the prediction based listings of the results of the panel of prediction-centric diagnostic metrics further comprises providing user configurable prediction based listings of the results.

9. The method of claim 8, wherein providing the user configurable prediction based listings of the results further comprises providing to the user sortable prediction based listings of the results.

10. The method of claim 8, wherein providing the user configurable prediction based listings of the results further comprises providing to the user filtered prediction based listings of the results.

11. The method of claim 8, wherein providing the user configurable prediction based listings of the results further comprises generating a graphical user interface which displays the prediction based listings of the results, and which is configured to receive user inputs and in response to configure the prediction based listings of the results.

12. The method of claim 11, wherein generating the graphical user interface further comprises highlighting statistical outliers in the prediction based listings of the results.

13. The method of claim 11, wherein generating the graphical user interface further comprises highlighting failed queries to associate the failed queries with failure causes.

14. The method of claim 13, wherein highlighting failed queries to associate the failed queries with failure causes further comprises color coding failed queries by failure cause.

15. The method of claim 14, wherein the graphical user interface is configured to display identified probable causes of the failure of failed queries.

16. The method of claim 1, and further comprising training the machine learning classifier using the debugged machine learning classifier data set.

17. A human assisted method, implemented by a computing device, of debugging training data used to train a machine learning classifier, the method comprising:
obtaining a machine learning classifier training data set, wherein the machine learning classifier training data set comprises data instances mapped to predictions for those data instances;
debugging the machine learning classifier training data set using a computer-implemented integrated debugging tool configured to implement a debugging loop to obtain a debugged machine learning classifier data set for use in training a machine learning classifier, wherein debugging the machine learning classifier training data set using the integrated debugging tool further comprises:
running a panel of prediction-centric diagnostic metrics on the machine learning classifier training data; set and
providing to a user prediction-based listings of the results of the panel of prediction-centric diagnosis metrics;
wherein providing to the user the prediction-based listings of the results of the panel of prediction-centric diagnostic metrics further comprises providing user-configurable prediction based listings of the results;
wherein providing the user-configurable prediction based listings of the results further comprises generating a graphical user interface which displays the prediction based listings of the results, and which is configured to receive user inputs and in response to configure the prediction based listings of the results;
wherein generating the graphical user interface further comprises highlighting failed queries to associate the failed queries with failure causes; and
wherein the graphical user interface is configured to receive a user input corresponding to a prediction cluster, and in response to zoom into the prediction cluster to display individual predictions included in the prediction cluster.

18. A classifier analyzer, executed on a computing device, which provides human assisted debugging of machine learning classifier training data used to train a machine learning classifier, the classifier analyzer being configured to implement steps comprising:
obtaining a machine learning classifier training data set, wherein the machine learning classifier training data set comprises data instances mapped to predictions for those data instances, wherein each of the data instances comprises a data triplet containing a prediction ID, a weight and an input description;
evaluating potential errors in the data set according to one or more prediction-centric metrics;
displaying one or more of the potential errors in the data set along with one or more of the metrics in a format that is user-configurable with reference to one or more of the metrics; and
debugging the machine learning classifier training data set using a debugging loop, including removing one or more of the potential errors in the data set to obtain a debugged machine learning classifier data set for use in training a machine learning classifier.

19. The classifier analyzer of claim 18, wherein the step of debugging the machine learning classifier training data set further comprises:
determining whether data noise in the machine learning classifier training data set exceeds a threshold; and
performing an estimation and simplification step on the machine learning classifier training data set if the data noise in the machine learning classifier training data set exceeds the threshold to obtain a simplified training data set.

20. The classifier analyzer of claim 19, wherein performing the estimation and simplification step further comprises identifying hypothetical fixes to the machine learning classifier training data set and estimating effects of the hypothetical fixes on training data errors.

21. The classifier analyzer of claim 20, wherein the step of identifying hypothetical fixes to the machine learning classifier training data set and estimating effects of the hypothetical fixes on training data errors further comprises reducing data errors in the machine learning classifier training data set caused by at least one of distribution skewness and ambiguity, thereby exposing other types of data errors in the machine learning classifier training data set.

22. The classifier analyzer of claim 18, wherein debugging the machine learning classifier training data set using the debugging loop further comprises:
running a panel of prediction-centric diagnostic metrics on the machine learning classifier training data set; and providing to a user prediction based listings of the results of the panel of prediction-centric diagnostic metrics.

23. The classifier analyzer of claim 22, wherein the step of providing to the user the prediction based listings of the results of the panel of prediction-centric diagnostic metrics further comprises providing user configurable prediction based listings of the results.

24. The classifier analyzer of claim 23, wherein providing the user configurable prediction based listings of the results further comprises providing to the user sortable prediction based listings of the results.

25. The classifier analyzer of claim 23, wherein providing the user configurable prediction based listings of the results further comprises providing to the user filtered prediction based listings of the results.

26. The classifier analyzer of claim 23, wherein providing the user configurable prediction based listings of the results further comprises generating a graphical user interface which displays the prediction based listings of the results, and which is configured to receive user inputs and in response to configure the prediction based listings of the results.

27. The classifier analyzer of claim 26, wherein generating the graphical user interface further comprises highlighting statistical outliers in the prediction based listings of the results.

28. The classifier analyzer of claim 26, wherein generating the graphical user interface further comprises highlighting failed queries to associate the failed queries with failure causes.

29. The classifier analyzer of claim 28, wherein highlighting failed queries to associate the failed queries with failure causes further comprises color coding failed queries by failure cause.

30. The classifier analyzer of claim 29, wherein the graphical user interface is configured to display identified probable causes of the failure of failed queries.

31. The classifier analyzer of claim 26, wherein the graphical user interface is configured to receive a user input corresponding to a prediction cluster, and in response to zoom into the prediction cluster to display individual predictions included in the prediction cluster.

* * * * *

UNITED STATES PATENT AND TRADEMARK OFFICE
CERTIFICATE OF CORRECTION

| | | |
|---|---|---|
| PATENT NO. | : 7,426,497 B2 | Page 1 of 1 |
| APPLICATION NO. | : 10/931305 | |
| DATED | : September 16, 2008 | |
| INVENTOR(S) | : Ana Sultana Bacioiu et al. | |

It is certified that error appears in the above-identified patent and that said Letters Patent is hereby corrected as shown below:

In column 17, line 61, in Claim 17, delete "data; set" and insert -- data set; --, therefor.

In column 17, line 64, in Claim 17, delete "diagnosis" and insert -- diagnostic --, therefor.

In column 18, line 27, in Claim 18, delete "weight" and insert -- weight, --, therefor.

In column 18, line 36, in Claim 18, delete "set" and insert -- set, --, therefor.

Signed and Sealed this
Twenty-sixth Day of April, 2011

David J. Kappos
*Director of the United States Patent and Trademark Office*